8243X
D. Bulkeley,
Weather Strip,
Patented June 14, 1834.
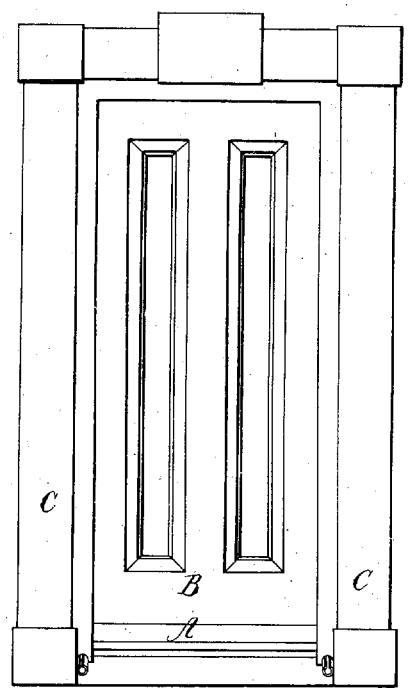
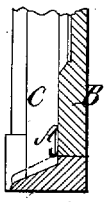
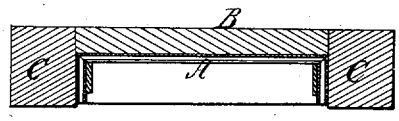
N. PETERS, PHOTO-LITHOGRAPHER, WASHINGTON, D. C.

Dan. Bulkeley Hampton Conn

Letters Patent

8743X

The schedule referred to in these Letters Patent and making part of the same containing a description in the words of the said Dan Bulkeley himself of his Improvement in the mode of making outer doors of Houses, Stores offices and other buildings called the door guard.

To all persons to whom these presents shall come. Dan Bulkeley of Hampton in the County of Windham and State of Connecticut sends Greeting Be it known that I the said Dan Bulkeley have invented constructed and applied to use a new and useful improvement in the mode of making outer doors of Houses &c. called the Door Guard specified in the words following to wit This improvement in the mode of making outer Doors of Houses, Stores offices and other buildings called the door guard is composed of iron, tin, lead, brass, pewter, copper or any malleable metal or wood so bent or constructed as to form a trough or channel which is affixed to the door near the bottom extending across its whole width, and across the threshhold sufficiently inclined as to cause the water as it trickles down the door to flow off to the ground instead of passing under the door into the building.

In testimony that the above is a true specification of my said improvement as above described I have hereto set my hand and seal this fifth day of May A D 1834

Dan. Bulkeley

Exd.
W.G.C.

Witnesses
David A Lumbard
Andrew L Bulkley 294 words

1834 June, 14

Drawing

P N 1.